United States Patent
Bindig et al.

(10) Patent No.: US 9,206,826 B2
(45) Date of Patent: Dec. 8, 2015

(54) RECEIVING ELEMENT AND FIXING ELEMENT MAGAZINE STRIP

(75) Inventors: Christian Bindig, Wunsiedel (DE); Mario Grazioli, Chur (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/117,552

(22) PCT Filed: Apr. 19, 2012

(86) PCT No.: PCT/EP2012/057110
§ 371 (c)(1),
(2), (4) Date: Feb. 5, 2014

(87) PCT Pub. No.: WO2012/159827
PCT Pub. Date: Nov. 29, 2012

(65) Prior Publication Data
US 2014/0186140 A1      Jul. 3, 2014

(30) Foreign Application Priority Data

May 20, 2011   (DE) .......................... 10 2011 076 239

(51) Int. Cl.
*F16B 15/08*      (2006.01)

(52) U.S. Cl.
CPC ...................... *F16B 15/08* (2013.01)

(58) Field of Classification Search
CPC .............................. A01B 12/006; F16B 15/08
USPC .......... 206/340, 343; 411/440, 444, 442, 445; 24/35; 59/2, 900; 198/853
IPC ...................................................... F16B 15/08
See application file for complete search history.

(56) References Cited

U.S. PATENT DOCUMENTS

| | | | |
|---|---|---|---|
| 2,823,789 A * | 2/1958 | Frederick .................... | 198/803.8 |
| 3,013,654 A * | 12/1961 | Hoff .............................. | 206/343 |
| 3,891,087 A | 6/1975 | Maynard | |
| 4,121,715 A * | 10/1978 | Hodil, Jr. ...................... | 206/347 |
| 4,404,744 A * | 9/1983 | Stenz et al. ..................... | 29/883 |
| 5,967,316 A * | 10/1999 | Abbruzzese et al. ......... | 206/343 |
| 2003/0136693 A1* | 7/2003 | Gupta ........................... | 206/343 |
| 2007/0074880 A1* | 4/2007 | Gaudron .......................... | 173/1 |
| 2010/0140123 A1* | 6/2010 | Miescher et al. ............. | 206/343 |
| 2010/0329818 A1* | 12/2010 | Yamamoto et al. ........... | 411/444 |

FOREIGN PATENT DOCUMENTS

| | | |
|---|---|---|
| CN | 1434220 A | 8/2003 |
| CN | 10 1258 332 A | 9/2008 |
| CN | 10 1978 178 A | 2/2011 |
| DE | 199 57 109 A1 | 5/2001 |
| DE | 10 2008 044 368 B3 | 11/2009 |

OTHER PUBLICATIONS

International Search Report, International Application No. PCT/EP2012/057110, mailed Jun. 27, 2012.

* cited by examiner

*Primary Examiner* — Gary Estremsky
(74) *Attorney, Agent, or Firm* — Leydig, Voit & Mayer

(57) ABSTRACT

The invention relates to a receiving element for a first and a second fixing element for use in bolt setting devices, comprising a receiving area (6) for the first fixing element (2) and comprising a connecting attachment (15) that is used together with the second fixing element to connect the receiving element (1) to a second receiving element (21) in a pivotal manner. The aim of the invention is to simplify the handling, production, and/or magazining of fixing elements for use in bolt setting devices. This is achieved in that the connecting attachment (15) has a detent and/or snap receiving portion (16) for the second fixing element.

20 Claims, 4 Drawing Sheets

RECEIVING ELEMENT AND FIXING ELEMENT MAGAZINE STRIP

TECHNICAL FIELD

The invention pertains to a receiving element for a first and for a second fastening element for use in bolt setting devices, with a receiving area for the first fastening element and with a connecting attachment, which is used together with the second fastening element, to connect the receiving element to a second receiving element in a pivotal manner. The invention further pertains to a fastening element magazine strip with several fastening elements, which are connected to one another by such receiving elements in a pivotal manner.

PRIOR ART

From German Patent Specification DE 10 2008 044 368 B3, a fastening element magazine strip is known that has a carrier strip formed by several strip segments connected to one another, wherein the strip segments comprise receiving areas in each of which a fastening element is mounted, wherein, in each case, two mutually adjacent strip segments are connected in each case by an attachment means in a chain link-like manner.

PRESENTATION OF THE INVENTION

The aim of the invention is to simplify the handling, manufacture and/or magazining of fastening elements for use in bolt setting devices.

In the case of a receiving element for a first and for a second fastening element for use in bolt setting devices, with a receiving area for the first fastening element and with a connecting attachment, which is used to connect the receiving element in a hinge-like manner, in a chain link-like manner and/or in a pivotal manner to a second fastening element, the aim is achieved in that the connecting attachment comprises a detent and/or snap receiving portion for the second fastening element and/or the second receiving element. The first fastening element is arranged, for example, in the receiving area of the first receiving element. The detent and/or snap receiving portion according to the invention is used to connect the first receiving element to the second receiving element or to the second fastening element, which in turn is received in a receiving area of the second receiving element. According to an essential aspect of the invention, two receiving elements are connected to one another by having the detent and/or snap receiving portion of the first receiving element grip encompass the second fastening element or the second receiving element. The detent and/or snap receiving portion here provides the advantage that the receiving elements can be attached repeatedly without destruction to one another in a separable manner.

A preferred embodiment example of the receiving element is characterized in that the receiving area for the first fastening element comprises a receiving area for the detent and/or snap receiving portion of a third receiving element. The detent and/or snap receiving portion of the first receiving element is used to connect the first receiving element to a second fastening element in the second receiving element. The receiving area in the first receiving element is used to connect the third receiving element to the first receiving element. As a result of the inventive design of the receiving element, any number of receiving elements, each of which receives a fastening element, can be connected to one another in a pivotal manner.

An additional preferred embodiment example of the receiving element is characterized in that the receiving area is slightly larger than the detent and/or snap receiving portion of the third receiving element. As a result, on the one hand, the production of the pivotal connection between the receiving element and the respective fastening element is simplified. In addition, the larger dimensions of the receiving area allow a pivoting of the two receiving elements relative to one another. Via the size of the receiving area, the pivoting angle of the receiving elements relative to one another can be limited.

An additional preferred embodiment example of the receiving element is characterized in that the receiving area for the first fastening element is a central through-hole that extends through a receiving base body. The inner diameter of the central through-hole corresponds preferably to the outer diameter of the fastening elements.

An additional preferred embodiment example of the receiving element is characterized in that the receiving base body is in the shape of a straight circular cylinder, which is interrupted by the receiving area for the detent and/or snap receiving portion of the third receiving element. The receiving area is preferably in the shape of a slit, which extends perpendicularly to a longitudinal axis of the receiving base body.

An additional preferred embodiment example of the receiving element is characterized in that the receiving body is subdivided by the receiving area for the detent and/or snap receiving portion of the third connection element into two half bodies, which are connected to one another by a connection tab. The two half bodies are essentially in the shape of straight circular cylinder casings.

An additional preferred embodiment example of the receiving element is characterized in that the detent and/or snap receiving portion starts from the connection tab. The detent and/or snap connection extends from the connection tab relative to the outer diameter of the receiving base body, preferably radially outward.

An additional preferred embodiment example of the receiving element is characterized in that the detent and/or snap connection and the connection tab are connected by a spacer piece in such a manner that they form a single part. Via the length of the spacer piece, the distance between the fastening elements and the pivoting angle between the two receiving area elements are influenced or defined.

An additional preferred embodiment of the receiving element is characterized in that the detent and/or snap connection is in the shape of a circular arc, which partially encompasses the second fastening element or the second receiving element. The circular arc extends preferably over an angular range of more than 180 degrees, but less than 270 degrees, around the fastening element. Here, the length of the circular arc is preferably adjusted particularly to the material from which the detent and/or snap connection is made, so that the detent and/or snap connection can be connected repeatedly without destruction to the fastening element. The material from which the detent and/or snap receiving portion is made is preferably a resilient material, preferably a resilient plastic material.

An additional preferred embodiment example of the receiving element is characterized in that two free ends of the detent and/or snap receiving portion are arranged at a distance from one another, which is smaller than the outer diameter of the fastening elements or of the receiving area of a second receiving element. As a result, it is ensured that the fastening element or the receiving area of the second receiving element does not become detached in an undesirable manner from the detent and/or snap receiving portion. The detent and/or snap receiving portion can also be prestressed against the fastening element or the receiving area of the second receiving element.

An additional preferred embodiment example of the receiving element is characterized in that an inner diameter of the detent and/or snap connection corresponds to the outer diameter of the fastening elements or of the receiving area. As a result, a stable connection between two receiving elements is made possible in a simple manner.

An additional preferred embodiment example of the receiving element is characterized in that the receiving elements are designed as identical parts. As a result, the manufacture of magazine strips of any desired length is made possible in a simple manner.

An additional preferred embodiment example of the receiving element is characterized in that the fastening elements are designed as identical parts. Preferably, in each case, a fastening element is arranged in the receiving area of the receiving element. At the same time, the fastening element is encompassed by a detent and/or snap receiving portion of an adjacent receiving element.

An additional preferred embodiment example of the receiving element is characterized in that the receiving element is designed as an injection molded part made of plastic. As a result, the manufacture of the receiving elements is simplified. Optionally, the fastening elements can be overmolded during the manufacture with the receiving elements.

The invention further relates to a fastening element magazine strip having several fastening elements that are connected to one another by means of the above-described receiving elements in a hinge-like manner, in a chain link-like manner and/or in a pivotal manner. The fastening elements are preferably nails or bolts made of metal. The fastening element magazine strip is used in a bolt setting apparatus, for example, in order to make available a reserve of fastening elements, which are driven into a substrate using the bolt setting device. In the process, the fastening elements are preferably removed individually from the fastening element magazine strips.

Additional advantages, features and details of the invention can be obtained from the description below in which various embodiment examples are described in detail in reference to the drawing. In the drawing.

EMBODIMENT EXAMPLES

Figure 1:
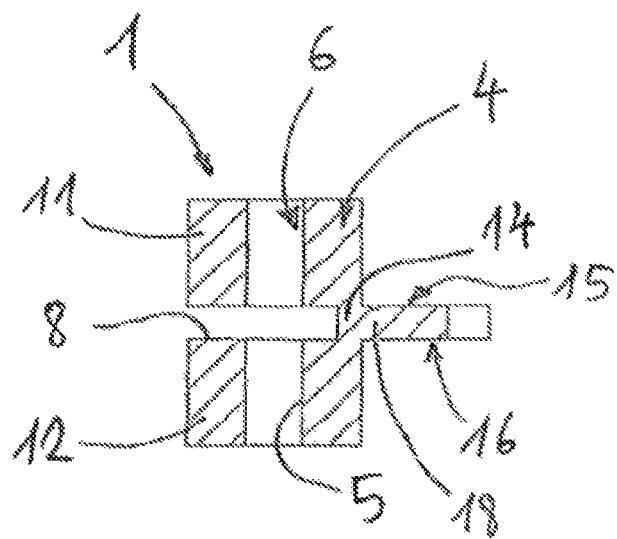
FIG. 1 shows a receiving element according to the invention in longitudinal section.
Figure 2:
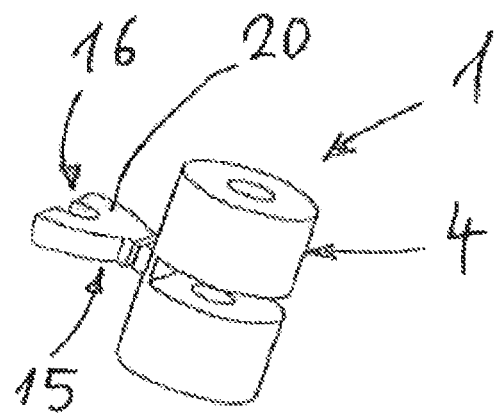
FIG. 2 shows a perspective representation of the receiving element of FIG. 1.
Figure 3:
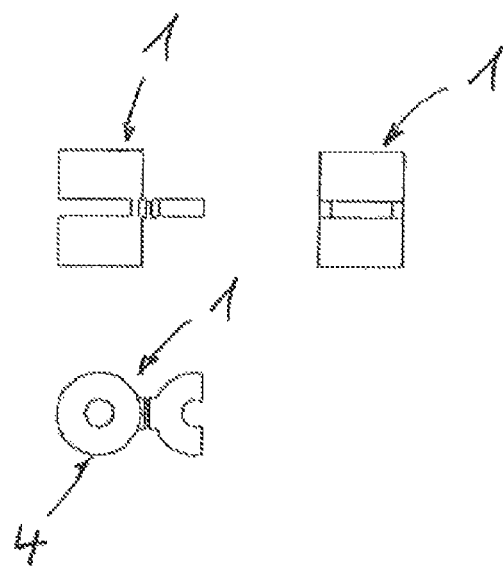
FIG. 3 shows the receiving element of FIGS. 1 and 2 in a front view, a side view, and a top view.
Figure 4:
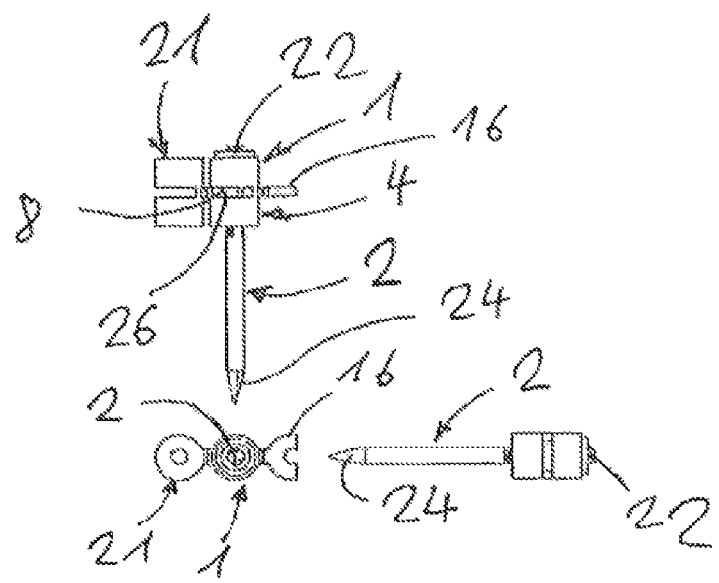
FIG. 4 shows a front view, a top view, and a side view of two receiving elements, which are connected to one another by means of a fastening element in a pivotal manner.
Figure 5:
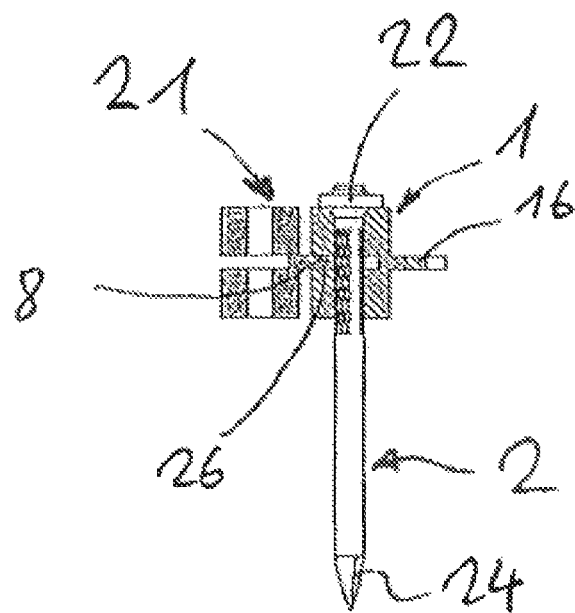
FIG. 5 shows the two receiving elements of FIG. 4 in longitudinal section.
Figure 6:
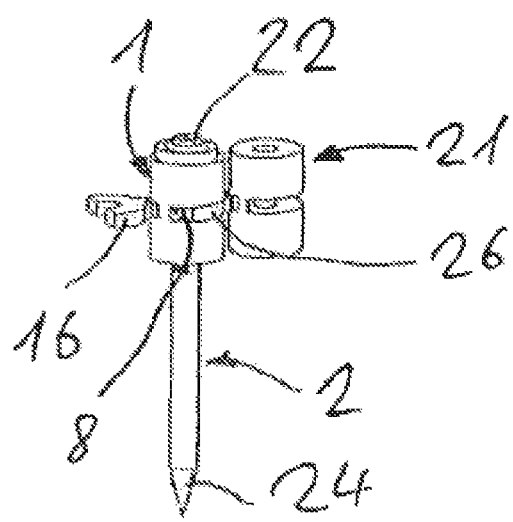
FIG. 6 shows a perspective representation of the two receiving elements with the fastening element of FIGS. 4 and 5.

In FIGS. 1-3, a receiving element 1 is shown in various views. In FIGS. 4-6, the receiving element 1 is represented together with a fastening element 2 and with a second receiving element 21 in various views.

The receiving elements 1 and 21 are designed as identical parts and they can be connected to one another in a pivotal manner by means of the fastening element 2 in a simple manner, in order to form a strip of any desired length from a plurality of receiving elements and fastening elements. Here, a fastening element is associated with each receiving element. Each receiving element can be connected to two additional receiving elements in a pivotal manner.

The receiving element 1 comprises a receiving base body 4, which is in the shape of a straight circular cylinder with a central through-hole 5. The central through-hole 5 represents a receiving area 6 for a fastening element, such as the one bearing the reference numeral 2 in FIGS. 4 to 6.

The receiving base body 4 comprises in the center, relative to its longitudinal extent, a receiving area 8 that is designed as a slit. By means of the receiving area 8, the receiving base body 4 is divided into two half bodies 11, 12, which are connected to one another to form a single piece by a connection tab 14.

From the connection tab 14, a connecting attachment 15 extends radially outward. The connecting attachment 15 comprises a detent and/or snap receiving portion 16 for a fastening element. By means of a spacer piece 18, the detent and/or snap receiving portion 16 of the connecting attachment 15 is connected to the connection tab 14 to form a single piece.

The detent and/or snap receiving portion 16 is in the shape of a circular arc 20, whose inner diameter corresponds to the outer diameter of the fastening elements. Here, the circular arc 20 in the detent and/or snap receiving portion 16 is dimensioned and designed in such a manner that it encompasses the outer diameter of the fastening element in the manner of a detent assembly. When an attachment element is brought together with the receiving element 1, the detent and/or snap receiving portion 16 of the receiving element 1 snaps into or engages with the fastening element.

In FIGS. 4 to 6, one can see how the fastening element 2 is received in the receiving area 6 of the receiving element 1. The fastening element 2 is designed as a nail with a nail head 22 and a nail tip 24. The nail head 22 is applied against one end of the receiving area base body 4. The fastening element 2 extends from the nail head 22 through the central through-hole 5 of the receiving base body 4. The nail tip 24 of the fastening element 2 extends out of the receiving base body 4. The fastening element 2 is arranged with approximately one-fourth of its total length in the receiving base body 4.

In FIGS. 4 to 6, one can see moreover that a detent and/or snap receiving portion 26 of the receiving element 21 is arranged in such a manner in the receiving area 8 of the receiving element 1 that the detent and/or snap receiving portion 26 encompasses the outer diameter of the fastening element 2, in order to establish a detent connection or snap connection between the receiving element 21 and the fastening element 2. The snap connection or detent connection can be loosened repeatedly without destruction. If desired, the detent and/or snap connection can also be designed in such a manner that it breaks at the time of the loosening.

Figure 7:
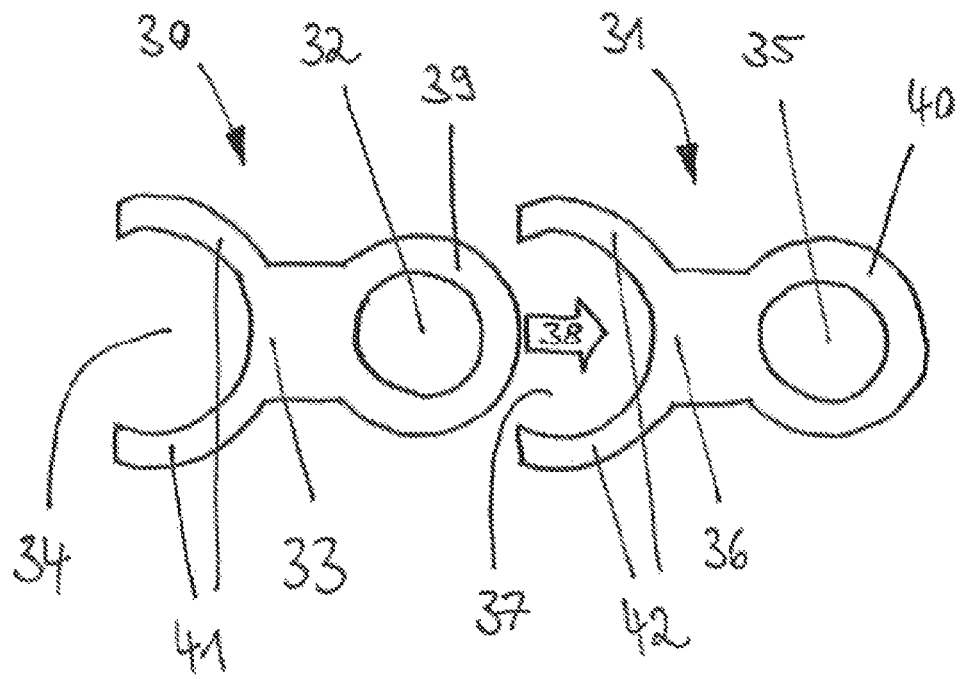
FIG. 7 shows two receiving elements in a top view.

In FIG. 7, a first receiving element 30 and a second receiving element 31 are represented in a top view, each being produced as an injection molded part made of plastic. The first receiving element 30 has a first receiving area 32 for a first fastening element, which is not shown, and for a connecting attachment 33 with a detent receiving area 34. The second receiving element 31 has a second receiving area 35 for a second fastening element, which is not shown, and for a connecting attachment 36 with a second detent receiving area 37. The receiving areas 32, 35 are here each formed by a central through-hole in a cylindrical first receiving base body 39 or in a cylindrical second receiving base body 40. The inner diameter of the through-holes is here in each case identical to the outer diameter of the fastening elements, which are not shown.

The detent receiving areas 34, 37 are formed by first detent arms 41 that are in the shape of a circular arc or second detent arms 42 that are in the shape of a circular arc, which together form a circular arc of approximately 210 degrees. The inner diameter of the circular arc is here exactly as large as the outer diameter of the respective receiving base body 39, 40. In this manner, the respective free ends, for example, of the second detent arms 42, are at a distance from one another, which is smaller than the outer diameter of the receiving base body 39. In an embodiment example that is not shown, the detent receiving area is prestressed against the receiving area of the adjacent receiving element, by the inner diameter of the circular arc being smaller than the outer diameter of the respective receiving base body.

By the engagement of the first receiving area 32 with the second detent receiving area 37 along the arrow 38, it is thus possible to connect the first receiving element 30 to the second receiving element 31. The first receiving base body 39 is here encompassed by the second detent receiving area 37 or the second detent arms 42 thereof. In this manner, any desired number of receiving elements, each of which receives a fastening element, can be connected to one another in a pivotal manner to form a strip, wherein the pivoting axis in each case extends perpendicularly to the plane of the drawing of FIG. 7 through the axis of symmetry of the receiving base body 39. In the case of a pivoting, for example, the second detent arms 42 here slide tangentially along the outer side of the first receiving base body 39. The strips are then rolled up, for example, and optionally inserted into a roll magazine.

Figure 8:
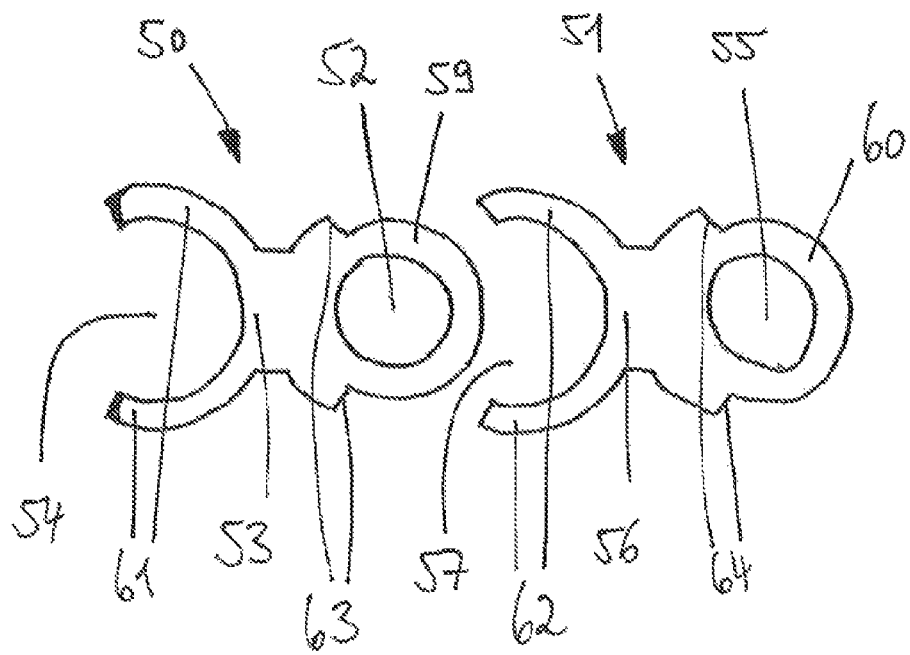
FIG. 8 shows two receiving elements in a top view.

In FIG. 8, a first receiving element 50 and a second receiving element 51 according to an additional embodiment example are represented in a top view. The first receiving element 50 has a first receiving area 52 for a first fastening element, which is not shown, and a connecting attachment 53 with a detent receiving area 54. The second receiving element 51 has a second receiving area 55 for a second fastening element, which is not shown, and for a connecting attachment 56 with a second detent receiving area 57. The receiving areas 52, 55 are here each formed by a central through-hole in a cylindrical first receiving base body 59 or in a cylindrical second receiving base body 60. The first receiving base body 59 has on its exterior first ledges 63, and the second receiving base body 60 has on its exterior second ledges 64. The detent receiving areas 54, 57 are formed by first detent arms 61 that are in the shape of a circular arc, or second detent arms 62 that are in the shape of a circular arc.

At the time of the engagement of the first receiving area 52 with the second detent receiving area 57, the first receiving base body 59 is encompassed by the second detent receiving area 57 or the second detent arms 62 thereof. The free ends of the second detent arms 62 then abut against the ledges 63, so that a swiveling about an axis perpendicular to the plane of the drawing of FIG. 8 is effectively prevented. In this manner, it is again possible to connect any desired number of receiving elements, each of which receives a fastening element, to one another to form a relatively stiff strip, wherein the stiffness makes the strip easier to handle.

The invention claimed is:

1. A receiving element for a first and for a second fastening element for use in bolt setting devices, with a receiving area for the first fastening element and with a connecting attachment, which is used together with one of the second fastening element and a second receiving element to connect the receiving element to the second receiving element, wherein the receiving area for the first fastening element is a central through-hole, which extends through a receiving base body, and wherein the connecting attachment comprises a detent and/or snap receiving portion for one of the second fastening element and the second receiving element, and wherein the receiving base body is subdivided by a recess into two half bodies, which are connected to one another by a connection tab, the recess receiving a detent and/or snap receiving portion of a third receiving element.

2. The receiving element according to claim 1, wherein the detent and/or snap receiving portion starts from the connection tab.

3. The receiving element according to claim 2, wherein the detent and/or snap receiving portion and the connection tab are connected to one another by a spacer piece so as to form a single part.

4. A receiving element for a first and for a second fastening element for use in bolt setting devices, with a receiving area for the first fastening element and with a connecting attachment, which is used together with one of the second fastening element and a second receiving element to connect the receiving element to the second receiving element, wherein the connecting attachment comprises a detent and/or snap receiving portion for the one of the second fastening element and the second receiving element, and wherein the detent and/or snap receiving portions each have two free ends, and the two free ends of the detent and/or snap receiving portion are arranged at a distance from one another, which is smaller than an outer diameter of the one of the second fastening element and the second receiving element.

5. The receiving element according to claim 4, wherein the receiving area for the first fastening element is a central through-hole, which extends through a receiving base body.

6. The receiving element according to claim 5, wherein the receiving base body is subdivided by a recess into two half bodies, which are connected to one another by a connection tab, the recess receiving a detent and/or snap receiving portion of a third receiving element.

7. A receiving element for a first and for a second fastening element for use in bolt setting devices, with a receiving area for the first fastening element and with a connecting attachment, which is used together with one of the second fastening element and a second receiving element to connect the receiving element to the second receiving element, wherein the connecting attachment comprises a snap receiving portion for the one of the second fastening element and the second receiving element.

8. The receiving element according to claim 7, wherein the receiving area for the first fastening element comprises a recess, the recess receiving a snap receiving portion of a third receiving element.

9. The receiving element according to claim 8, wherein the receiving area is greater than the snap receiving portion.

10. The receiving element according to claim 7, wherein the receiving area for the first fastening element is a central through-hole, which extends through a receiving base body.

11. The receiving element according to claim 10, wherein the receiving base body is in the shape of a straight circular cylinder, which is interrupted by the receiving area for the snap receiving portion of the third receiving element.

12. The receiving element according to claim 11, wherein the receiving base body is subdivided by the receiving area for the snap receiving portion of the first receiving element into two half bodies, which are connected to one another by a connection tab.

13. The receiving element according to claim 7, wherein the snap receiving portion is in the shape of a circular arc, which partially encompasses the second fastening element and/or the second receiving element.

14. The receiving element according to claim 7, wherein an inner diameter of the snap receiving portion corresponds to an outer diameter of the fastening elements and/or to an outer diameter of the receiving area.

15. The receiving element according to claim 7, wherein the receiving element is an injection molded part made of plastic.

16. Fastening element magazine strips having several fastening elements, which are connected by receiving elements according to claim 7 in a hinge-like manner, in a chain link-like manner and/or in a pivotal manner.

17. The fastening element magazine strips according to claim 16, wherein the receiving elements are identical parts.

18. The fastening element magazine strips according to claim 16, wherein the fastening elements are identical parts.

19. The receiving element according to claim 7, wherein the receiving area for the first fastening element is a central through-hole, which extends through a receiving base body.

20. The receiving element according to claim 19, wherein the receiving base body is subdivided by a recess into two half bodies, which are connected to one another by a connection tab, the recess receiving a detent and/or snap receiving portion of a third receiving element.

* * * * *